United States Patent
Alsafar

(10) Patent No.: US 11,504,733 B1
(45) Date of Patent: Nov. 22, 2022

(54) AUTONOMOUS PAINT SPRAYING MACHINE

(71) Applicant: GIFTEDNESS AND CREATIVITY COMPANY, Safat (KW)

(72) Inventor: Amal A A A Alsafar, Safat (KW)

(73) Assignee: GIFTEDNESS AND CREATIVITY COMPANY, Safat (KW)

( * ) Notice: Subject to any disclaimer, the term of this patent is extended or adjusted under 35 U.S.C. 154(b) by 0 days.

(21) Appl. No.: 17/567,844

(22) Filed: Jan. 3, 2022

(51) Int. Cl.
*B05B 13/04* (2006.01)
*B05B 13/00* (2006.01)

(52) U.S. Cl.
CPC .......... *B05B 13/041* (2013.01); *B05B 13/005* (2013.01)

(58) Field of Classification Search
CPC ............................ B05B 13/005; B05B 13/041
USPC ......................................................... 239/172
See application file for complete search history.

(56) References Cited

U.S. PATENT DOCUMENTS

| | | | | | |
|---|---|---|---|---|---|
| 1,999,563 | A | * | 4/1935 | Glasgow | E01C 23/22 239/150 |
| 5,358,568 | A | * | 10/1994 | Okano | B05B 15/68 118/712 |
| 5,671,889 | A | * | 9/1997 | Petty | B05B 7/0846 239/588 |
| 5,851,580 | A | * | 12/1998 | Amberg | E21D 11/105 118/712 |
| 5,927,609 | A | * | 7/1999 | Scarpa | B05B 7/1431 239/290 |
| 5,935,657 | A | * | 8/1999 | Melendez | B05B 13/04 239/281 |
| 5,968,271 | A | * | 10/1999 | Maxwell | B05B 15/68 118/712 |
| 6,589,343 | B1 | * | 7/2003 | Egeland | E21B 17/006 118/313 |
| 7,029,199 | B2 | * | 4/2006 | Mayfield | A63C 19/06 404/93 |

(Continued)

FOREIGN PATENT DOCUMENTS

| CN | 205276114 U | 6/2016 |
|---|---|---|
| CN | 106758734 A | 5/2017 |

OTHER PUBLICATIONS

"TinyMobileRobots®"; printed on Aug. 17, 2021 from https://tinymobilerobots.com/road-marking-robot/tinysurveyor/?gclid=EAlalQobChMIwtaok5yX5AIVNP_jBx1elQriEAAYASAAEgK7zPD_BwE.

*Primary Examiner* — Chee-Chong Lee
(74) *Attorney, Agent, or Firm* — Nath, Goldberg & Meyer; Richard C. Litman

(57) ABSTRACT

The autonomous paint spraying machine is an autonomous mobile system for making paint markings on surfaces. The autonomous paint spraying machine includes a chassis having longitudinally opposed first and second edges, where the first edge has a linear contour and the second edge has an arcuate contour. A linear track is mounted on the chassis adjacent the first edge, and an arcuate track is mounted on the chassis adjacent the second edge. A paint receptacle is mounted on an upper surface of the chassis, and a plurality of driven wheels are mounted on a lower surface of the chassis. A controller is configured for controlling actuation and orientation of the plurality of driven wheels. First and second spray nozzles each receive paint from the paint receptacle. The first spray nozzle is slidably mounted on the linear track, and the second spray nozzle is slidably mounted on the arcuate track.

14 Claims, 5 Drawing Sheets

(56) References Cited

U.S. PATENT DOCUMENTS

| | | | |
|---|---|---|---|
| 7,080,888 B2 * | 7/2006 | Hach | E04G 23/08 |
| | | | 299/30 |
| 7,294,204 B2 | 11/2007 | Hong et al. | |
| 8,726,833 B2 * | 5/2014 | Logan | B05B 13/041 |
| | | | 180/209 |
| 9,598,826 B2 | 3/2017 | Grimm et al. | |
| 2017/0359943 A1 | 12/2017 | Calleija et al. | |

* cited by examiner

AUTONOMOUS PAINT SPRAYING MACHINE

BACKGROUND

1. Field

The disclosure of the present patent application relates to paint spraying, and particularly to an autonomous paint spraying machine for painting surface markings.

2. Description of the Related Art

Surface markings are used in various settings to convey information. For example, surface markings, such as lines, stripes, arrows, words, symbols and the like, are often provided on roadways to provide drivers with road-related information (e.g., lane boundaries, stopping points, warning signs, turn lane designations and the like). Similarly, surface markings, such as numbers, words and/or designs, may be provided in parking lots to identify specific parking spots (e.g., handicapped and/or numbered parking spots).

The creation of such markings is typically either performed manually or by a painting device attached to a motor vehicle, which is driven over the area to be marked, with the paint either being dispensed through manual actuation of the device, or dispensed in regular intervals. Complex markings, such as signage, lettering or designs, is typically performed manually, requiring the blocking off of parking lots, roads and the likes. The vehicle-carried devices may be used without blocking off the general area, but are limited to making simple lines. Each method also requires the presence of workers, even when conditions are uncomfortable or dangerous. Thus, an autonomous paint spraying machine solving the aforementioned problems is desired.

SUMMARY

The autonomous paint spraying machine is an autonomous mobile system for making paint markings on surfaces, such as roadways, parking lots and the like. The autonomous paint spraying machine includes a chassis having longitudinally opposed first and second edges, where the first edge has a linear contour and the second edge has an arcuate contour. A linear track is mounted on the chassis adjacent the first edge, and an arcuate track is mounted on the chassis adjacent the second edge. A paint receptacle is mounted on an upper surface of the chassis, and a plurality of driven wheels are mounted on a lower surface of the chassis. An on-board controller is configured for controlling actuation and orientation of the plurality of driven wheels. Each of the driven wheels includes a drive motor for driving rotation and the orientation thereof, and each of the drive motors is in communication with the controller.

First and second spray nozzles are each in fluid communication with the paint receptacle for receiving paint therefrom. The first spray nozzle is slidably mounted on the linear track, and the second spray nozzle is slidably mounted on the arcuate track. First and second spray motors respectively drive sliding movement of the first and second spray nozzles on their respective linear and arcuate tracks. The first and second spray motors are each in communication with the controller, which is further configured for controlling actuation and direction of the first and second spray motors. Additionally, first and second spray pumps respectively drive flow of the paint through the first and second spray nozzles. The first and second spray pumps are each in communication with the controller, which is further configured for controlling actuation of the first and second spray pumps.

The autonomous paint spraying machine further includes a cover having a first sidewall, at least one second sidewall, a closed top end and an open bottom end. The cover is releasably mounted on the chassis, such that the paint receptacle and the controller are received within an open interior thereof. The top end of the cover may include a door for providing access to the open interior of the cover.

A first valve controls flow of the paint between the paint receptacle, the first spray nozzle and the second spray nozzle. The first valve is in communication with the controller, which is further configured for controlling the first valve. The paint receptacle may be divided into a first chamber and a second chamber, with each being adapted for receiving a volume of the paint. The first and second chambers may contain identical paint, or may, for example, contain different colors of paint, allowing the color of the paint used to be selected. A second valve controls flow of the paint to the first valve from the first chamber, the second chamber, or a combination thereof.

First, second and third shelves may be received within the open interior of the cover. The first shelf is mounted on, and covers, the paint receptacle. The first and second valves are mounted on the first shelf. The second shelf is mounted above the first shelf, and the controller is mounted on the second shelf. The third shelf is mounted above the second shelf, and an interface is mounted on the third shelf. The interface is in communication with the controller and may be accessed by the user through the door of the top end of the cover.

A first sensor may be mounted on the cover for scanning and mapping the area to be painted. At least two second sensors may also be mounted on both sides of the cover for object detection, thus allowing the autonomous paint spraying machine to avoid collisions, navigate lane changes and the like. A third sensor may also be mounted on the cover. The third sensor is an optical sensor, allowing a remote user to view operations of the autonomous paint spraying machine, remotely navigate the autonomous paint spraying machine, and provide visual feedback to the controller during autonomous operation. Each of the first, second and third sensors is in communication with the controller.

At least two fourth sensors may be mounted on the first shelf covering the paint receptacle. The fourth sensors may be facing down for each chamber. The fourth sensors can measure the paint level to facilitate controlling the painting process and ending the process before the paint reaches a very low level, to reduce the chances of any unwanted markings on surfaces.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
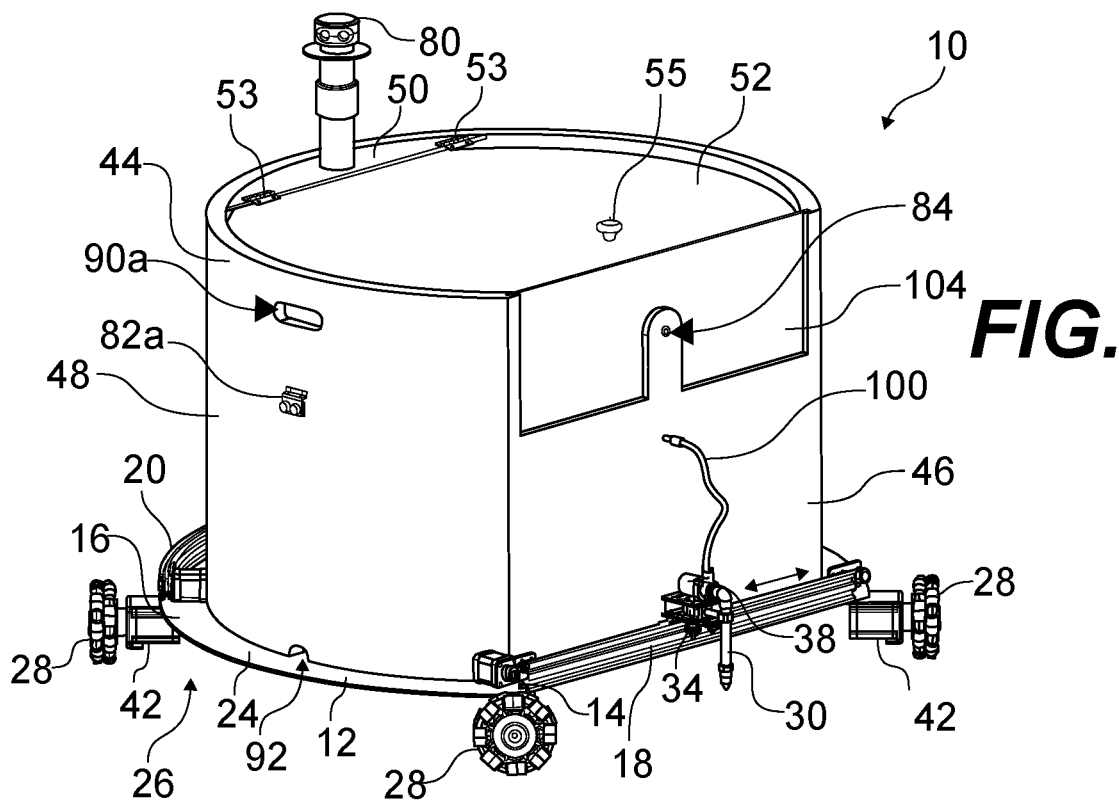
FIG. 1 is a perspective view of an autonomous paint spraying machine.

The autonomous paint spraying machine 10 is an autonomous mobile system for making paint markings on surfaces, such as roadways, parking lots and the like. As shown in FIGS. 1-4, the autonomous paint spraying machine 10 includes a chassis 12 having longitudinally opposed first and second edges 14, 16, respectively, where the first edge 14 has a linear contour and the second edge 16 has an arcuate contour. It should be understood that the particular shape and relative dimensions of chassis 12, as well as the degree of curvature of second edge 16, are shown in FIGS. 1-4 for exemplary purposes only.

Figure 2:
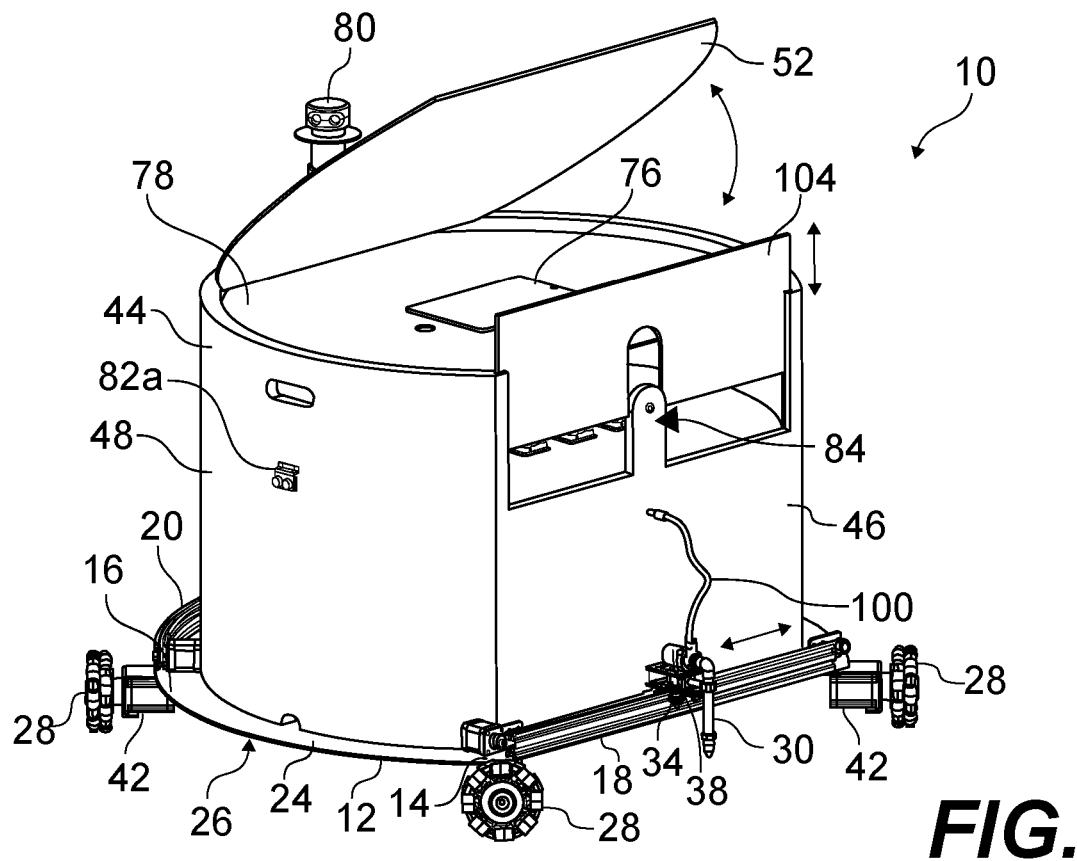
FIG. 2 is a perspective view of the autonomous paint spraying machine, showing opening of access ports thereof.
Figure 3:
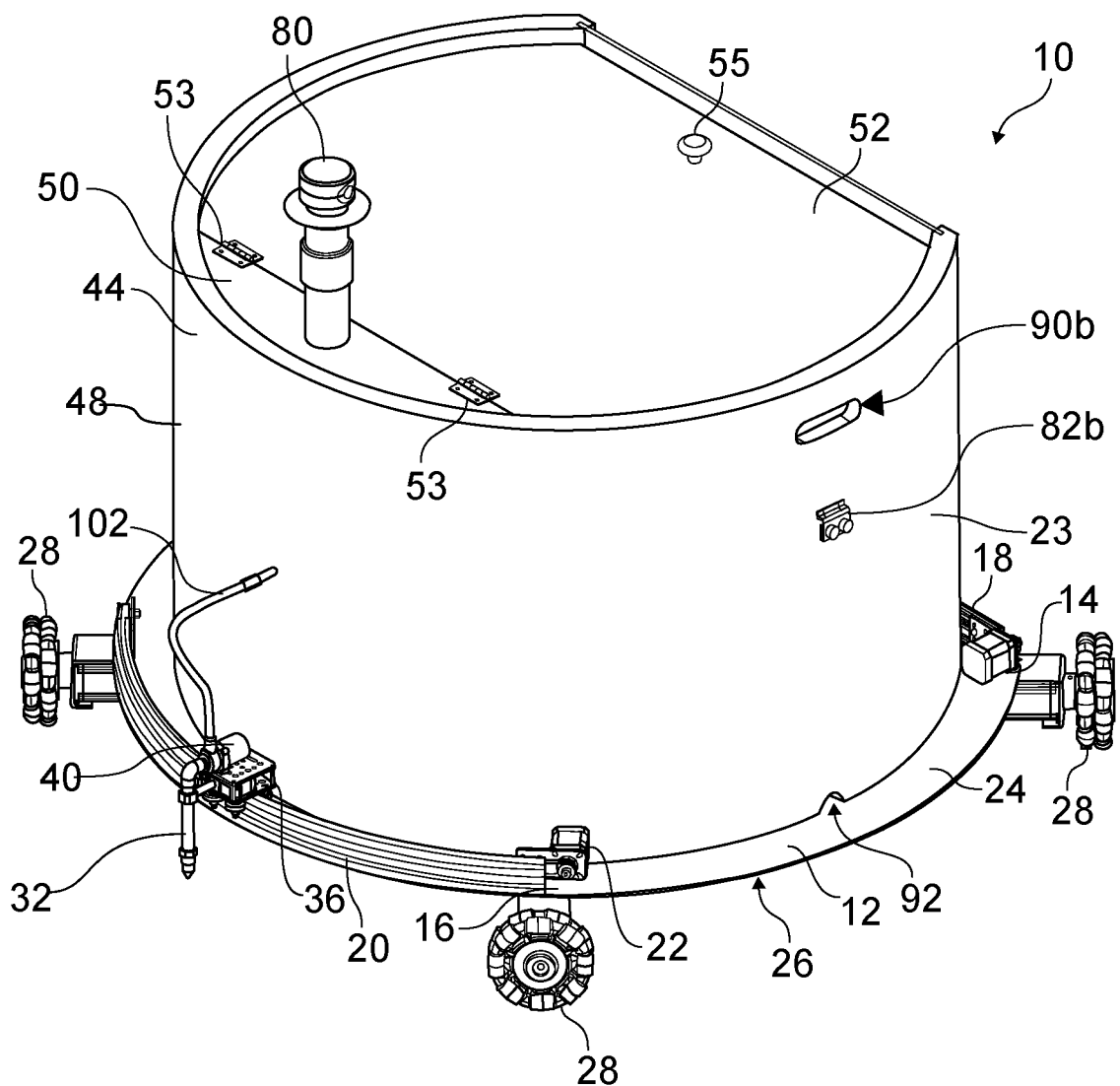
FIG. 3 is a perspective view of an opposite side of the autonomous paint spraying machine.
Figure 4:
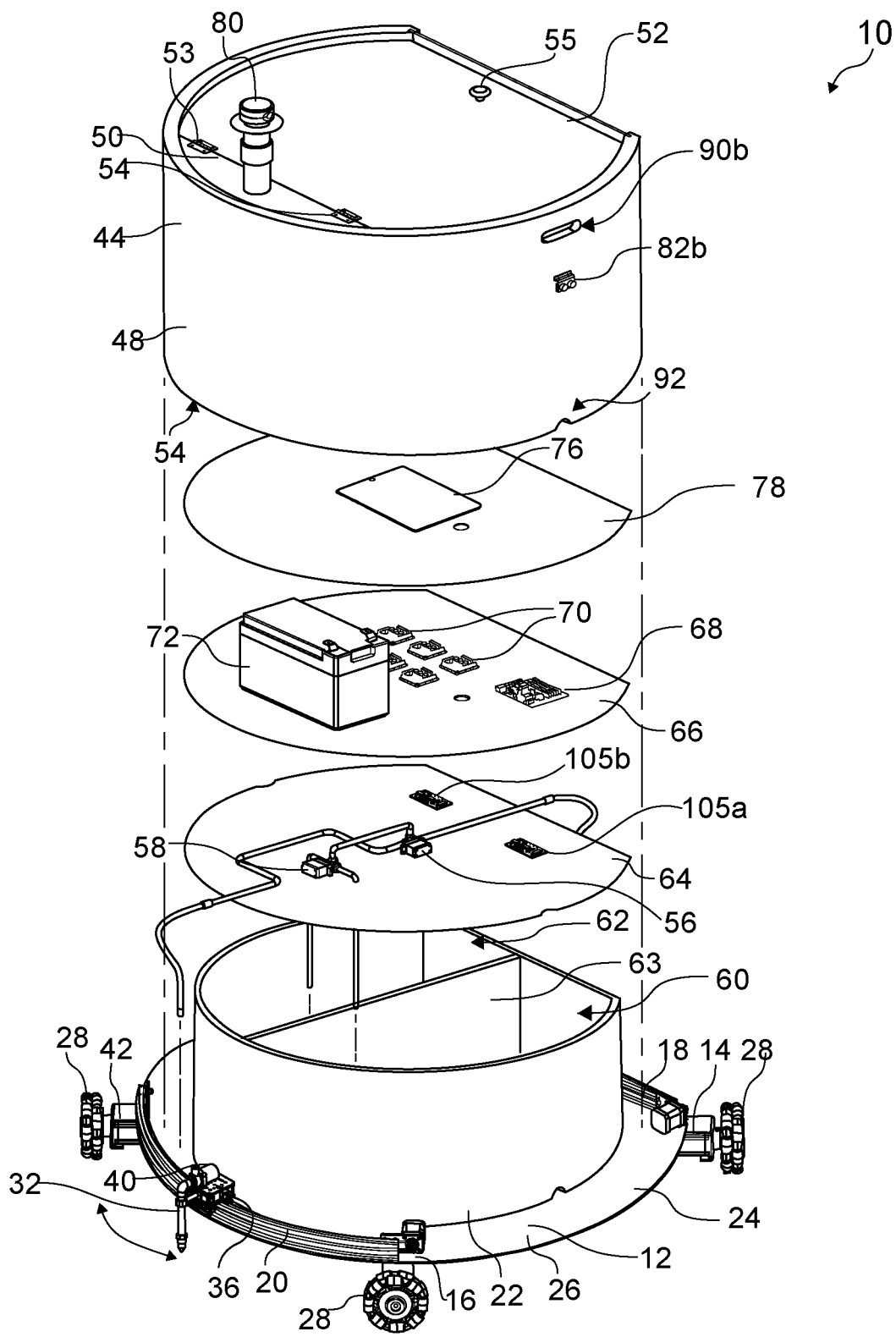
FIG. 4 is an exploded perspective view of the autonomous paint spraying machine.

As best seen in FIGS. 1 and 2, a linear track 18 is mounted on the chassis 12 adjacent the first edge 14. As best seen in FIGS. 3 and 4, an arcuate track 20 is mounted on the chassis 12 adjacent the second edge 16. It should be understood that the style, type, overall contouring and relative dimensions of tracks 18, 20 are shown in FIGS. 1-4 for exemplary purposes only. As a non-limiting example, tracks 18, 20 may be similar to those commonly used in computer numerical control (CNC) systems.

Figure 6:
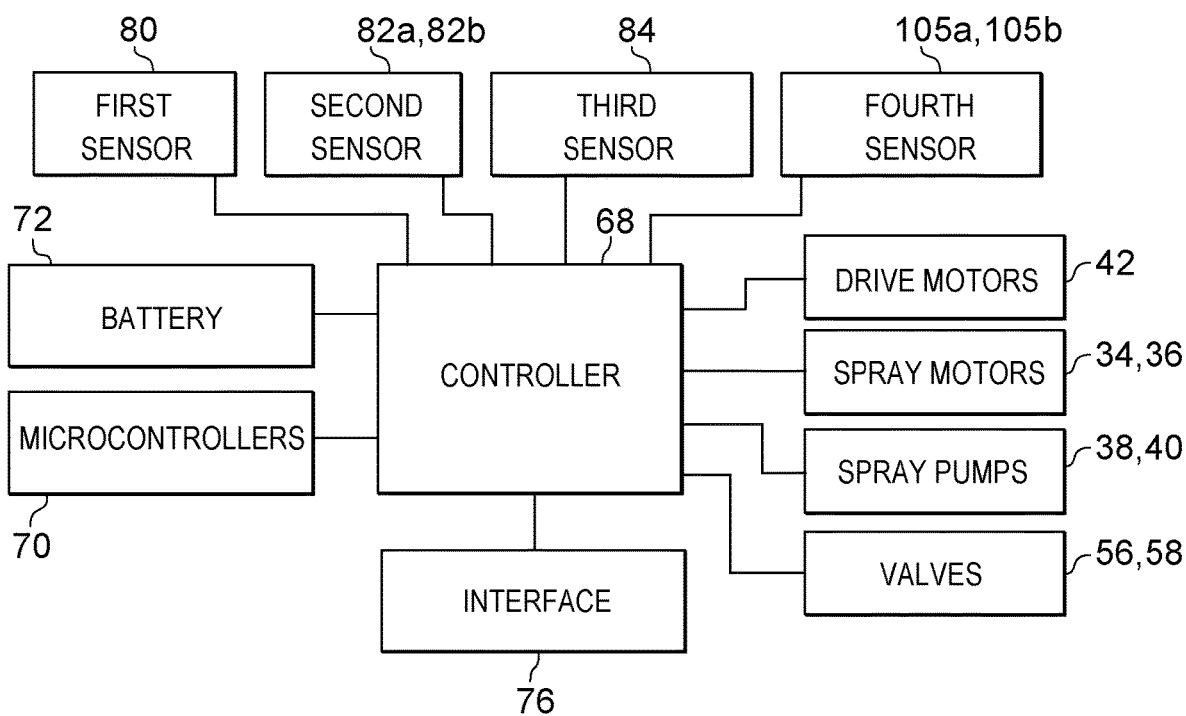
FIG. 6 is a block diagram showing system components of the autonomous paint spraying machine.

As shown in FIG. 4, a paint receptacle 22 is mounted on an upper surface 24 of the chassis 12, and a plurality of driven wheels 28 are mounted on a lower surface 26 of the chassis 12. It should be understood that the shape, positioning and relative dimensions of paint receptacle 22 are shown in FIG. 4 for exemplary purposes only. It should be further understood that paint receptacle 22 may receive any suitable type of paint or other fluid intended for spraying on a surface. Additionally, it should be understood that the style, type, size, positioning and number of driven wheels 28 shown in FIGS. 1-4 are shown for exemplary purposes only. With reference to FIGS. 4 and 6, an on-board controller 68 is configured for controlling actuation and orientation of the plurality of driven wheels 28. Each of the driven wheels 28 includes a drive motor 42 for driving rotation and the orientation thereof, and each of the drive motors 42 is in communication with the controller 68. It should be understood that any suitable type of drive motor, or any other suitable type of actuator, may be used. As a non-limiting example, drive motors 42 may be stepper motors. It should be understood that each of driven wheels 28 may also be controlled with regard to angular position in order to provide steering for the autonomous paint spraying machine 10. Preferably, the driven wheels 28 steer in sync, at least by each pair of driven wheels 28, in order to prevent tipping and provide precision steering control.

First and second spray nozzles 30, 32, respectively, are each in fluid communication with the paint receptacle 22 for receiving paint therefrom. The first spray nozzle 30 is slidably mounted on the linear track 18, and the second spray nozzle 32 is slidably mounted on the arcuate track 20. First and second spray motors 34, 36 respectively drive sliding movement of the first and second spray nozzles 30, 32 on their respective linear and arcuate tracks 18, 20. It should be understood that any suitable type of motors or other types of actuators or drivers may be used to drive movement of the first and second spray nozzles 30, 32 with respect to their respective tracks 18, 20. As a non-limiting example, spray motors 34, 36 may be stepper motors. The linearly traveling first spray nozzle 30 may be used, for example, to mark straight lines, and the arcuate traveling second spray nozzle 32 may be used, for example, to mark curved lines, or to spray in areas which are otherwise difficult to access.

The first and second spray motors 34, 36, respectively, are each in communication with the controller 68, which is further configured for controlling actuation and direction of the first and second spray motors 34, 36. Additionally, first and second spray pumps 38, 40, respectively, drive flow of the paint through the first and second spray nozzles 30, 32, respectively. The first and second spray pumps 38, 40, respectively, are each in communication with the controller 68, which is further configured for controlling actuation of the first and second spray pumps 38, 40. It should be understood that first and second spray pumps 38, 40 may be any suitable type of controllable pumps, operated, as a non-limiting example, by servo-motors or the like.

The autonomous paint spraying machine 10 further includes a cover 44 having a first sidewall 46, at least one second sidewall 48, a closed top end 50 and an open bottom end 54. It should be understood that the particular shape and relative dimensions of cover 44, as well as the degree of curvature of the exemplary continuously curved, singular second sidewall 48, are shown in FIGS. 1-4 for exemplary purposes only. The cover 44 is releasably mounted on the chassis 12, such that the paint receptacle 22 and the controller 68 are received within an open interior thereof. As best seen in FIGS. 2 and 3, the top end 50 of the cover 44 may include a door 52 for providing access to the open interior of the cover 44. It should be understood that hinges 53 and handle 55 for door 52 are shown for exemplary purposes only.

Figure 5:
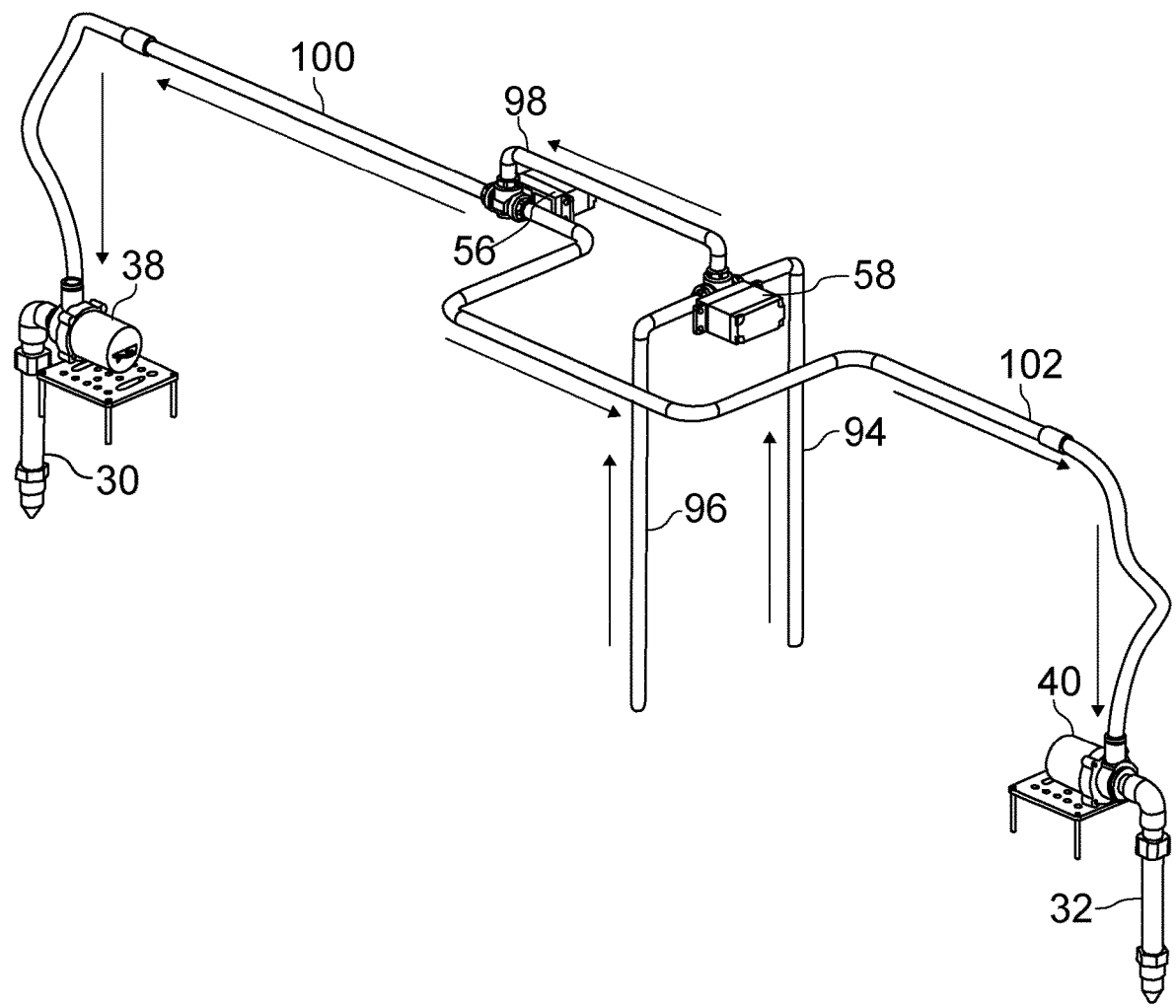
FIG. 5 is a perspective view of a paint distribution system of the autonomous paint spraying machine.

As shown in FIGS. 4 and 5, a first valve 56 controls flow of the paint between the paint receptacle 22, the first spray nozzle 30 and the second spray nozzle 32. The first valve 56 is in communication with the controller 68, which is further configured for controlling the first valve 56. As seen in FIG. 4, the paint receptacle 22 may be divided into a first chamber 60 and a second chamber 62, with each chamber 60, 62 being adapted for receiving a volume of the paint. The first and second chambers 60, 62 may contain identical paint, or may, for example, contain different colors of paint, allowing the color of the paint used to be selected. It should be understood that the even division of volume between first and second chambers 60, 62 is shown for exemplary purposes only, and that wall 63 may have any desired placement within paint receptacle 22. A second valve 58 controls flow of the paint to the first valve 56 from the first chamber 60, the second chamber 62, or a combination thereof. The second valve 58 is also in communication with controller 68 for control thereof. It should be understood that tubes 94, 96, 98, 100 and 102 are shown for exemplary purposes only, and that any suitable type of tubes or pipes may be used to carry and distribute the paint. It should be understood that first and second valves 56, 58 may be any suitable type of controllable valves, operated, as a non-limiting example, by servo-motors or the like.

Referring to FIG. 4, first, second and third shelves 64, 66, 78, respectively, may be received within the open interior of the cover 44. The first shelf 64 is mounted on, and covers, the paint receptacle 22. The first and second valves 56, 58 are mounted on the first shelf 64. It should be understood that the overall shape and relative dimensions of first shelf 64, and the placement of first and second valves 56, 58 thereon, are shown for exemplary purposes only. The second shelf 66 is mounted above the first shelf 64, and the controller 68 is mounted on the second shelf 66. It should be understood that the overall shape and relative dimensions of second shelf 66, and the placement of controller 68 thereon, are shown for exemplary purposes only. The third shelf 78 is mounted above the second shelf 66, and an interface 76 is mounted on the third shelf 78. The interface 76 is in communication with the controller 68, and may be accessed by the user through the door 52 of the top end 50 of the cover 44. Additional access may be provided by sliding panel 104, as best seen in FIG. 2.

It should be understood that each of first, second and third shelves 64, 66, 78 may have any necessary openings, slots, grooves or the like for the mounting of components, the passage of wires, grasping by the user, etc. Similarly, cover 44 may have any desired features for gripping and handling by the user, such as, for example, slots 90 and grooves 92.

In FIG. 4, controller 68 is shown with additional processors or microcontrollers 70. It should be understood that controller 68 may be a singular unit, including all necessary processors and/or microcontrollers and/or control units, or may be used in conjunction with additional processors or microcontrollers, such as additional processors or microcontrollers 70. As a non-limiting example, controller 68 may be a microcontroller with a built in gyroscope and accelerometer for navigational control, as well as to detect (and compensate for) tipping and proper orientation of the autonomous paint spraying machine 10. Programming of controller 68 may be accomplished through interface 76 which, as a further non-limiting example, may be a tablet computer or similar device with a touchscreen and an independent processor. Interface 76, for example, may be a tablet computer with programming and operational software stored thereon and/or with wireless capability, allowing for remote operation and programming by a remotely located user who communicates with the autonomous paint spraying machine 10 through, for example, the internet.

As a further non-limiting example, the additional processors or microcontrollers 70 may be one or more modular microcontrollers, such as those manufactured by Phidgets Inc. of Canada. The additional processors or microcontrollers 70 may, for example, be used when high precision is required. For example, the additional processors or microcontrollers 70 may be used to provide the exact voltage and current, with a very high degree of precision, to each one of the drive motors 42, thus minimizing the chance of tilting and/or driving out of a desired path or lane. Power for controller 68, additional processors or microcontrollers 70, interface 76, drive motors 42, spray motors 34, 36, spray pumps 38, 40, and valves 56, 58 may be provided by a rechargeable battery 72 or the like. It should be understood that rechargeable battery 72 may be charged by any suitable source of power. As a non-limiting example, one or more solar panels may be mounted on cover 44 for charging battery 72.

Additionally, a first sensor 80 may be mounted on the cover 44 for scanning and mapping the area to be painted. It should be understood that the tower-type support for first sensor 80 shown in FIGS. 1-4 is shown for exemplary purposes only, and that first sensor 80 may be mounted in any suitable manner providing 360° scanning and mapping capability. Two of the second sensors 82a, 82b may also be mounted on both sides of the cover 44 for object detection, thus allowing the autonomous paint spraying machine 10 to avoid collisions, navigate lane changes and the like. It should be understood that first sensor 80 and second sensors 82a, 82b may be any suitable type of scanning sensors. As a non-limiting example, the first sensor 80 and second sensors 82a, 82b may be lidar-based sensors. Additionally, it should be understood that the mount for first sensor 80 may include any desired additional components. As a non-limiting example, first sensor 80 may be co-mounted with a 360° yellow light emitting diode (LED), provided as a warning signal to alert drivers on the road of the presence of the autonomous paint spraying machine 10.

A third sensor 84 may also be mounted on the cover 44. The third sensor 84 is an optical sensor, such as a digital camera or the like, allowing a remote user to view operations of the autonomous paint spraying machine 10, remotely navigate the autonomous paint spraying machine 10, and provide visual feedback to the controller 68 during autonomous operation. Each of the first, second and third sensors 80, 82a, 82b, 84, respectively, is in communication with the controller 68.

In use, the user may enter a reference point (for example, the northeast corner of a parking lot to be painted) into interface 76 (either on-site or remotely), and first sensor 80 may be used to map the parking lot with respect to that initial reference point. The desired type of marking (e.g., line-striping, parking space numbering, traffic signage, etc.) may be programmed via interface 76 (either on-site or remotely), and the autonomous paint spraying machine 10 may then operate autonomously to perform the desired task. Second sensors 82 may be used to, for example, prevent collisions with unanticipated obstacles (such as a person or vehicle which was not present when the area was initially mapped), and the third optical sensor 84 may be used to provide additional navigational feedback and/or to allow the user to remotely drive the autonomous paint spraying machine 10 to a desired location.

Each of the fourth sensors 105a, 105b may be mounted in any suitable manner to detect paint level. The fourth sensors 105a, 105b maybe mounted on the first shelf 64 facing down over chambers 60, 62, respectively. The fourth sensors 105a, 105b can measure the paint level in both chambers 60, 62. Each of the fourth sensors 105a, 105b is in communication with the controller 68. It should be understood that each of the fourth sensors 105a, 105b may be any suitable type of level sensors. As a non-limiting example, each of the fourth sensors 105a, 105b may be ultrasonic-based sensors.

It is to be understood that the autonomous paint spraying machine is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. An autonomous paint spraying machine, comprising:
   a chassis having longitudinally opposed first and second edges, wherein the first edge has a linear contour and the second edge has an arcuate contour;
   a linear track mounted on the chassis adjacent the first edge;
   an arcuate track mounted on the chassis adjacent the second edge;
   a paint receptacle mounted on an upper surface of the chassis;
   a plurality of driven wheels mounted on a lower surface of the chassis;
   a controller configured for controlling actuation and orientation of the plurality of driven wheels;

a first spray nozzle in fluid communication with the paint receptacle for receiving paint therefrom, the first spray nozzle being slidably mounted on the linear track;

a second spray nozzle in fluid communication with the paint receptacle for receiving the paint therefrom, the second spray nozzle being slidably mounted on the arcuate track;

a cover having a first sidewall, at least one second sidewall, a closed top end and an open bottom end, the cover being releasably mounted on the chassis, such that the paint receptacle and the controller are received within an open interior of the cover, wherein the top end of the cover comprises a door for providing access to the open interior of the cover;

a first valve for controlling flow of the paint between the paint receptacle, the first spray nozzle and the second spray nozzle, wherein the first valve is in communication with the controller, the controller being further configured for controlling the first valve, wherein the paint receptacle is divided into a first chamber and a second chamber, each being adapted for receiving a volume of the paint;

a second valve for controlling flow of the paint to the first valve from the first chamber, the second chamber, or a combination thereof;

a first shelf mounted on, and covering, the paint receptacle, the first and second valves being mounted on the first shelf; and a second shelf mounted above the first shelf, the controller being mounted on the second shelf, wherein the first and second shelves are received within the open interior of the cover.

2. The autonomous paint spraying machine as recited in claim 1, further comprising:
a first spray motor for driving sliding movement of the first spray nozzle on the linear track; and
a second spray motor for driving sliding movement of the second spray nozzle on the arcuate track,
wherein the first and second spray motors are each in communication with the controller, the controller being further configured for controlling actuation and direction of the first and second spray motors.

3. The autonomous paint spraying machine as recited in claim 1, further comprising:
a first spray pump for selectively driving flow of the paint through the first spray nozzle; and
a second spray pump for selectively driving flow of the paint through the second spray nozzle,
wherein the first and second spray pumps are each in communication with the controller, the controller being further configured for controlling actuation of the first and second spray pumps.

4. The autonomous paint spraying machine as recited in claim 1, wherein each of the driven wheels comprises a drive motor for driving rotation and the orientation thereof, wherein each of the drive motors is in communication with the controller.

5. The autonomous paint spraying machine as recited in claim 1, further comprising:
a third shelf mounted above the second shelf; and
an interface mounted on the third shelf and in communication with the controller,
wherein the third shelf and the interface are received within the open interior of the cover, the interface being accessible to a user via the door of the top end of the cover.

6. The autonomous paint spraying machine as recited in claim 1, further comprising a first sensor for scanning and mapping an area to be painted, the first sensor being in communication with the controller.

7. The autonomous paint spraying machine as recited in claim 6, further comprising at least two second sensors for object detection, the at least two second sensors being in communication with the controller.

8. The autonomous paint spraying machine as recited in claim 7, further comprising a third sensor in communication with the controller, wherein the third sensor comprises an optical sensor.

9. The autonomous paint spraying machine as recited in claim 1, further comprising at least two fourth sensors in communication with the controller, wherein each of the two fourth sensors comprises a paint level sensor.

10. An autonomous paint spraying machine, comprising:
a chassis having longitudinally opposed first and second edges, wherein the first edge has a linear contour and the second edge has an arcuate contour;
a linear track mounted on the chassis adjacent the first edge;
an arcuate track mounted on the chassis adjacent the second edge;
a paint receptacle mounted on an upper surface of the chassis;
a plurality of driven wheels mounted on a lower surface of the chassis;
a controller configured for controlling actuation and orientation of the plurality of driven wheels;
a first spray nozzle in fluid communication with the paint receptacle for receiving paint therefrom, the first spray nozzle being slidably mounted on the linear track;
a second spray nozzle in fluid communication with the paint receptacle for receiving the paint therefrom, the second spray nozzle being slidably mounted on the arcuate track;
a first spray motor for driving sliding movement of the first spray nozzle on the linear track;
a second spray motor for driving sliding movement of the second spray nozzle on the arcuate track, wherein the first and second spray motors are each in communication with the controller, the controller being further configured for controlling actuation and direction of the first and second spray motors;
a first spray pump for selectively driving flow of the paint through the first spray nozzle;
a second spray pump for selectively driving flow of the paint through the second spray nozzle, wherein the first and second spray pumps are each in communication with the controller, the controller being further configured for controlling actuation of the first and second spray pumps;
a first sensor for scanning and mapping an area to be painted, the first sensor being in communication with the controller;
at least two of the second sensors for object detection, the at least two of the second sensor being in communication with the controller;
a third sensor in communication with the controller, wherein the third sensor comprises an optical sensor; and
at least two fourth sensors mounted on the first shelf.

11. The autonomous paint spraying machine as recited in claim 10, wherein each of the driven wheels comprises a drive motor for driving rotation and the orientation thereof, wherein each of the drive motors is in communication with the controller.

12. The autonomous paint spraying machine as recited in claim 10, further comprising a cover having a first sidewall, at least one second sidewall, a closed top end and an open bottom end, the cover being releasably mounted on the chassis, such that the paint receptacle and the controller are received within an open interior of the cover.

13. The autonomous paint spraying machine as recited in claim 10, further comprising a first valve for controlling flow of the paint between the paint receptacle, the first spray nozzle and the second spray nozzle, wherein the first valve is in communication with the controller, the controller being further configured for controlling the first valve.

14. The autonomous paint spraying machine as recited in claim 13, wherein the paint receptacle is divided into a first chamber and a second chamber, each being adapted for receiving a volume of the paint, the autonomous paint spraying machine further comprising a second valve for controlling flow of the paint to the first valve from the first chamber, the second chamber, or a combination thereof.

\* \* \* \* \*